United States Patent
Strong et al.

(10) Patent No.: US 7,796,779 B1
(45) Date of Patent: Sep. 14, 2010

(54) EFFICIENT SYNCHRONIZATION OF CHANGES TO IMAGES

(75) Inventors: Jack Benjamin Strong, Sunnyvale, CA (US); Vijay Myneni, San Mateo, CA (US); Vivek Patel, San Carlos, CA (US); Kiren Sekar, San Francisco, CA (US)

(73) Assignee: SugarSync, Inc., San Mateo, CA (US)

( * ) Notice: Subject to any disclaimer, the term of this patent is extended or adjusted under 35 U.S.C. 154(b) by 898 days.

(21) Appl. No.: 11/636,358

(22) Filed: Dec. 8, 2006

Related U.S. Application Data

(60) Provisional application No. 60/839,836, filed on Aug. 24, 2006.

(51) Int. Cl.
*G06K 9/00* (2006.01)
*G09G 5/00* (2006.01)

(52) U.S. Cl. .................. 382/100; 382/293; 345/619

(58) Field of Classification Search .............. 382/100, 382/112, 113, 114, 155, 168, 181, 182, 183, 382/184, 185, 188–203, 209, 215, 216, 219, 382/232, 254, 260, 274, 276, 286–290, 305, 382/311, 321; 348/234, 222.1; 455/426.1; 1/1; 358/1.15; 345/619
See application file for complete search history.

(56) References Cited

U.S. PATENT DOCUMENTS

| | | | |
|---|---|---|---|
| 6,904,185 B1 * | 6/2005 | Wilkins et al. | 382/311 |
| 7,103,357 B2 * | 9/2006 | Kirani et al. | 455/426.1 |
| 7,319,536 B1 * | 1/2008 | Wilkins et al. | 358/1.15 |
| 7,369,161 B2 * | 5/2008 | Easwar et al. | 348/222.1 |
| 7,372,485 B1 * | 5/2008 | Bodnar et al. | 348/234 |
| 7,502,795 B1 * | 3/2009 | Svendsen et al. | 1/1 |
| 7,576,752 B1 * | 8/2009 | Benson et al. | 345/619 |

* cited by examiner

*Primary Examiner*—Seyed Azarian

(57) ABSTRACT

A change to an image is synchronized. A modified image is obtained at a first device where the modified image is associated with modified metadata. The modified metadata is stored in a store associated with the first device. The metadata is sent from the first device to a second device, where the modified image is able to be generated on the second device using the modified metadata and a preexisting image file on the second device.

15 Claims, 14 Drawing Sheets

*Metadata stored in a local store on a device* 600

| Image | Photograph 1 | | |
|---|---|---|---|
| | Field 1 (Rotation of image) | Field 2 (Red eye reduction) | Field 3 (Cropping) |
| Revision No. | | | |
| Timestamp | | | |
| Unsynchronized bit | | | |
| Value(s) | | | |

FIG. 6A

*Metadata stored in a data store on a central repository* 650

| Image | Photograph 1 | | |
|---|---|---|---|
| | Field 1 (Rotation of image) | Field 2 (Red eye reduction) | Field 3 (Cropping) |
| Revision No. | | | |
| Timestamp | | | |
| Member who made last change | | | |
| Device last change was made from | | | |
| Value(s) | | | |

FIG. 6B

EFFICIENT SYNCHRONIZATION OF CHANGES TO IMAGES

CROSS REFERENCE TO OTHER APPLICATIONS

This application claims priority to U.S. Provisional Patent Application No. 60/839,836 entitled COLLABORATIVE GROUP PHOTO ALBUMS filed Aug. 24, 2006 which is incorporated herein by reference for all purposes.

BACKGROUND OF THE INVENTION

As more and more people use digital cameras, more and more people will want to view, share, and edit photographs. In some cases, a user wants to share or synchronize an edited image. For example, there may only be one image of a particular scene or event but that one image is not perfect. For example, the image may be a group of friends, but some or all of the people depicted have red eye. In another example, two people captured in a picture look fine, but unbeknownst to the couple and the person taking the picture, a stranger jumped into the picture. In these examples, edits such as red eye reduction and cropping, respectively, would be desirable to make the images more attractive. However, some techniques to exchange or synchronize changes may be inefficient or consume a relatively large amount of resources. It would be desirable to develop techniques to store, manipulate, and/or transfer changes to images in a manner that conserves resources or improves performance.

BRIEF DESCRIPTION OF THE DRAWINGS

Various embodiments of the invention are disclosed in the following detailed description and the accompanying drawings.

FIG. 6A is a diagram illustrating an embodiment of metadata stored in a local store on a device.

FIG. 6B is a diagram illustrating an embodiment of metadata stored in a data store on a central repository.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
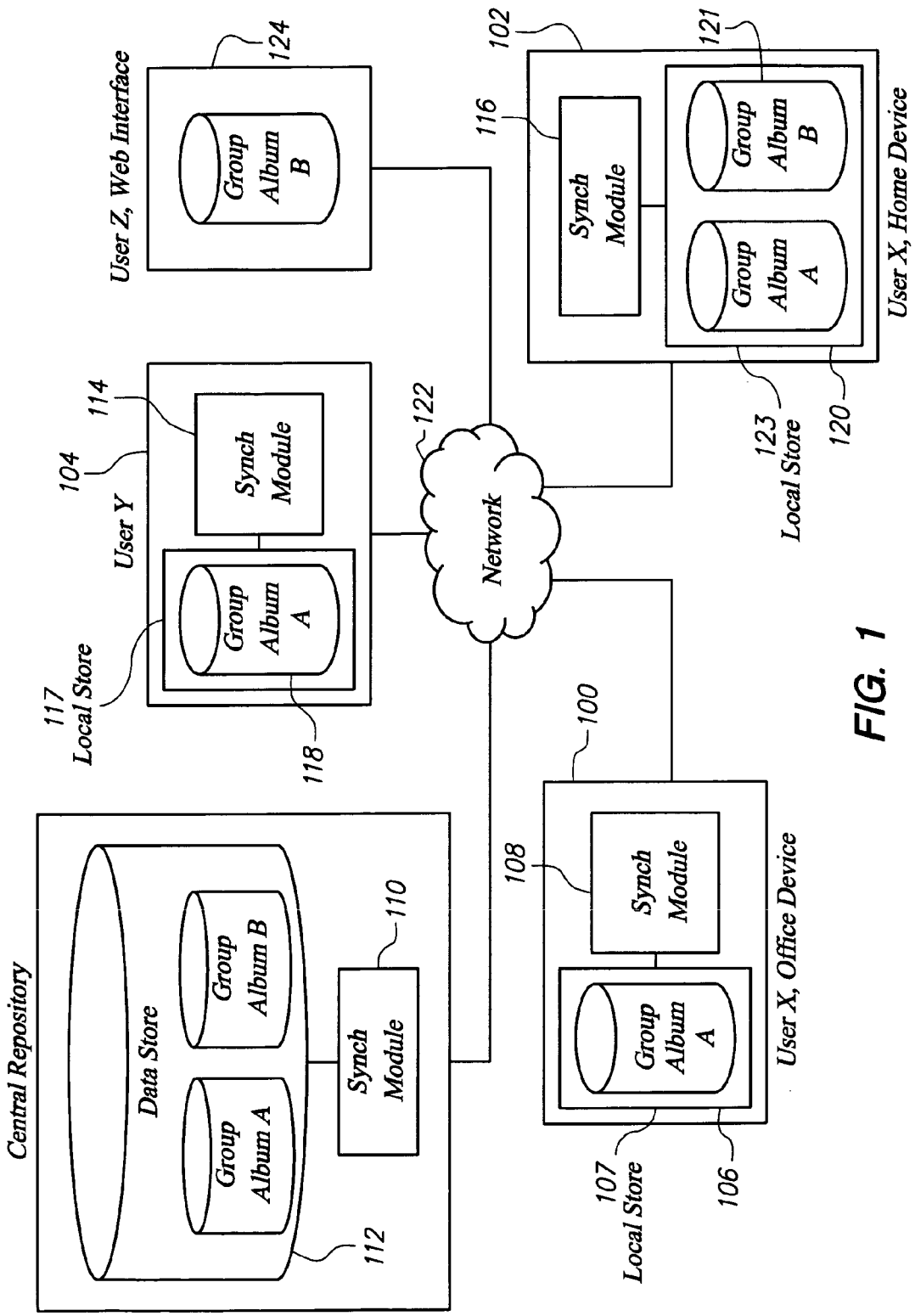
FIG. 1 is a system diagram illustrating an embodiment of a system for providing access to group albums.

FIG. 1 is a system diagram illustrating an embodiment of a system for providing access to group albums. In the example shown, members of a group album are able to access and/or modify one or more group albums for which they are members of. In some embodiments, a group album includes a collection of photographs that are able to be accessed and modified by members of that group album. A member that creates a particular group album is referred to as a creator. In some embodiments, a creator adds an initial set of photographs to the group album, edits one or more of the photographs (if so desired), and then invites one or more new members to join the group. Once invited, a member is able to view photographs, add photographs, delete photographs, and/or edit photographs, etc. included in the group album. For example, a group of people may go on a trip together and share their pictures from the trip using a group album. In some embodiments, an invited member is permitted to invite more members. In some embodiments, a member is not permitted to invite more members to join a group.

In the example shown, user X is associated with office device 100 and home device 102. For example, office device 100 may be a desktop or laptop computer that is owned by user X's company. Home device 102 may be a computer that user X owns. In this example, a group album application has been downloaded to devices 100 and 102. In some embodiments, a group album application is configured to provide features, functionality, or capabilities associated with accessing, searching, organizing, and/or manipulating one or more group albums of one or more photographs. User X is a member of group albums A and B, respectively. In this example, user X has configured the group album application running office device 100 to only provide access to group album A. For example, even though user X is permitted to access group album B, he may not want to have group album B accessible via office device 100 for a variety of reasons. For example, group album B may include photographs that are inappropriate for a work environment or office device 100 may be shared with other users. The group album application on home device 102 has been configured so that group albums A and B are accessible via home device 102.

This is one example of a way in which a user may configure his devices; in some embodiments a user configures his devices differently. In some embodiments, should user X later decide to change the group albums that are accessible via device 100 and/or 102, he is able to implement such a change via the group album application running on the device he wants to configure differently (e.g., make group album B available via office device 100 using group album application running on office device 100).

User Y has access to group album A via device 104 and user Z has access to group album B via a web interface. For example, in some embodiments, a user runs an Internet browser (e.g., Microsoft Internet Explorer or Mozilla Firefox) and goes to a website associated with group albums. In some embodiments, a user provides a user name and a password, and after the user name and password are verified, access to group albums for which that user is a member of is provided. In this example, some synchronization or refresh technique associated with the web interface performs functionality similar to a synchronization module (e.g., associated with device 100, 102, and/or 104) and thus no synchronization module is used with device 124. In some embodiments, some other synchronization or refresh technique is used, such as one that is associated with a particular mobile telephone network, satellite network, interface and/or device.

As shown in the example, a user can be a member of more than one group (e.g., user X is a member of group albums A and B). Similarly, this example illustrates that a given device can be used to provide access to multiple group albums (e.g., device 102 provides access to group albums A and B). In various embodiments, a user can be a member of any number of group albums, a group album can have any number of members, a member can access a group album via any number of interfaces/devices, a group album can include any number of photographs, etc.

As an example of a modification, if user X adds a new photograph to group album A, local store 107 on office device 100 in some embodiments is updated to include a copy of the new photograph. In some embodiments, this is a separate copy from user X's original copy. A local store in some embodiments includes sufficient information to provide a user with access and/or modification of a group album. For example, in some embodiments, a local store includes images files of all photographs included in a group album. Synchronization modules 108 and 110 may then communicate with each other so that data store 112 is synchronized with local store 107 or otherwise updated to include the new photograph. Any appropriate communication technique may be used. Synchronization module 110 communicates with synchronization module 114 and 116 so that local stores 117 and 123, respectively, are synchronized with data store 112. Applications running on devices 102 and 104 may refresh or regenerate a display so that a new photograph (or some other change) is displayed. Similarly, user Y is able to modify group album A via device 104, user Z is able to modify group album B via a web interface, and/or user X can modify group album A or B via home device 102.

In various embodiments, a synchronization module is implemented in a variety of ways. In some embodiments, synchronization modules use a push architecture. For example, if user Y removes a photograph from group album A, synchronization module 114 in some embodiments pushes the change to synchronization module 110 and/or synchronization module 110 in turn pushes the change to synchronization module 108. In some embodiments, a pull architecture is used. In some embodiments, a synchronization module associated with a central repository (e.g., synchronization module 110) has different functionality than one associated with a device (e.g., synchronization module 108, 114, or 116). For example, in some embodiments, synchronization modules associated with devices are slaves and a synchronization module associated with a central repository is a master. Synchronization module 110 in some embodiments periodically polls synchronization modules at devices to determine if there is a change.

Using the example system, members of a group can have a collaborative and/or common work space in which to share and/or manipulate photographs. Some existing techniques for sharing photographs may be inconvenient for users. For example, one user may upload their photographs to one photo sharing and/or photo printing website and another user may upload their photographs to another website. Without a common or collaborative area for people to share photographs, it may be difficult to determine which photograph is the best if there are similar photographs (e.g., a group shot photograph where more than one person's camera was used). In some embodiments, a group album includes other information that is synchronized, such as captions, comments, tags or other metadata associated with the photographs. People can have back and forth exchanges using comments or collaborate on creating captions for the pictures (e.g., if a person is listing names of people in a photograph and doesn't know someone's name, a blank space can be left and someone else can provide the unknown person's name later).

Another issue associated with using some existing photo sharing techniques is that people may be able to view a photograph (e.g., via a web interface) but they may not necessarily have a copy of the image file (e.g., a JPEG file). This may be inconvenient if, for example, the photographs are shared using a photo printing service's website and a user prefers another service to print their photographs. In some embodiments, members have copies of the image files using group albums. For example, in some embodiments, a local store on a device comprises of a directory of JPEG files or files in some other format. In some embodiments, other applications or processes besides a group album application (e.g., image editing applications, or photo organization applications, file system, operating system, etc.) are able to open and manipulate image files in a local store.

As an example of how a group album could be used, a group of people go on a trip together and take pictures using multiple cameras. After the trip, one member creates a group album, adds some or all of their photographs, and invites the other people to join the group. In some cases, the creator does not have everyone's contact information and one of the invited members invites them. Everyone adds their photographs to the group album and can use a variety of tools and/or features to manipulate, edit, arrange, and/or organize the photographs in the group album. For example, as members add their photographs they can arrange them chronologically so that similar photographs are located near each other. In some embodiments, chronologically arranging photographs is performed automatically during importation or adding (e.g., based on a timestamp in the photograph's metadata describing when a photograph was taken). Members of a group album can identify similar photographs and, if so desired, delete less attractive photographs. In some cases, one member has more experience or talent in editing photographs and may crop photographs, adjust colors, or reduce red-eye. Since the edits are performed on photographs in a group album, other members are able to benefit and have copies of the improved photographs.

In some embodiments, synchronization is performed in substantially real time. That is, changes to the group album are synchronized and displayed so that other group members are able to see a change almost immediately after it is performed. In some cases, this is within a few minutes, seconds, or a fraction of a second. In some applications, having synchronization be performed in substantially real time is desirable. For example, one member of a group album may be unable to attend an event. Another member who is able to attend the event takes pictures (e.g., using his camera phone), the pictures are sent to the absent member in substantially real time, and the absent member is able to see what is happening at the event. Appropriate support is provided in some embodiments, so that new pictures are automatically added to a group album and are thus synchronized. For example, it may be inconvenient to require the member taking pictures to periodically interact with his camera phone to add new pictures to a group album. In some embodiments, there is some process to automatically detect a new picture and interface with a group album application to add the new picture to a group album.

An amount of time associated with substantial real time synchronization varies from embodiment to embodiment. In some embodiments, it is within a few seconds. In some embodiments, it is with a few minutes. In some embodiments, a maximum synchronization time or other parameter is programmable by an application and/or specified by a user. For example, some users may not care if synchronization takes up to a minute or so to occur. For some users, it may be sufficient to for synchronization to be performed within a few minutes. In some systems, a maximum synchronization time affects performance or some resource of a device and a maximum synchronization time or other parameter is set accordingly. For example, increasing a synchronization time may cause less power to be consumed for a mobile phone or other device with a battery (e.g., because a synchronization module needs to communicate less frequently with a synchronization module at a central repository). A synchronization time in some embodiments is set appropriately to balance synchronization performance with power consumption or some other measurement.

In some embodiments, off-line access to a group album is provided for some or all of the devices shown. For example, since devices 100, 102, and 104 have local stores 107, 123, and 117, copies of the photographs in group albums A and/or B are available even if connection to network 122 is lost. If a device disconnects from network 122, access and/or modification capabilities are provided using information stored in a device's local store. For example, if device 102 were to disconnect from network 122, user X would still be able to access and modify photographs in group albums A and B using local store 123, respectively. Once a connection to network 122 is reestablished, local store 123 are synchronized with data store 112. Once data store 112 is updated, data store 112 is synchronized with other local stores (e.g., local stores 107 and/or 117).

In this example, user Z does not have off-line access to group album B via a web interface. In this example, no local store associated with group album B is stored on device 124 and user Z does not have off-line support if device 124 disconnects from network 122. In some embodiments, at least some degree of off-line support for a web interface is supported. For example, in some embodiments, a user is able to view and/or modify a group album in an off-line mode using a web interface. A local store may be created on a device (e.g., as HyperText Markup Language (HTML) data, Extensible Markup Language (XML) data, etc.) that an Internet browser application is able to use when a connection to network is not available.

A local store is implemented as appropriate in various embodiments based on, for example, the particular constraints or devices of an embodiment. For example, in some embodiments, a local store is stored in persistent memory (e.g., magnetic disk) so that if an application is closed and/or a device is powered down, a group album is available when the application begins and/or the device is powered on. Any appropriate data structure can be used to implement a local store. For example, in some embodiments a local store includes a table, a database, and/or a collection of files.

In some embodiments, a local store has a copy of a photograph that is separate from an original copy (e.g., stored in a directory entitled, "My pictures"). In some applications this is desirable since group members are able to edit a photograph. If the original copy (e.g., the file my_photo.jpg) is copied when it is added to a group album (e.g., creating a new file grp_albm_A_pic_1.jpg), then the original copy would still be available and/or unmodified even if another member edits or deletes the copy associated with the group album. In some embodiments, edits or deletions are implemented in such a manner so that a single copy of a file is maintained on a given device. For example, if user X has a photograph stored on home device 102 and adds it to group album A, in some embodiments, there is only a single copy of that photograph stored on device 102. In some embodiments, edits or changes to a photograph are implemented as modified metadata (also referred to simply as metadata) and it is thus possible to maintain single copy of a photograph even if it is changed (e.g., by a member of a group). For example, in some embodiments, a single image file is stored and multiple versions of metadata are stored where one version of the metadata corresponds to an unmodified version of the photograph and the other corresponds to the modified version of the photograph. In some cases, an unmodified or original image is associated with no modified metadata and when a first or initial change is made modified metadata is created and is associated with the image. Alternatively, in some embodiments, there is some modified metadata associated with an unmodified or original image (e.g., that is waiting to be filled with changes to the image, if any). Storing a single image file on a given device is desirable in some applications, for example if a device has a limited amount of storage since an image file (e.g., a JPEG file) may take up a non-trivial amount of memory.

In various embodiments, access to a group album is provided using various devices. Some examples of devices that may be used are desktop/laptop computers, Personal Digital Assistants (PDAs), mobile phones (e.g., including smart phones that have an operating system such as Microsoft Windows Mobile or Palm OS), audio-visual content players, game consoles, etc.

Network 122 uses any appropriate network, communication protocol, or devices. For example, a connection associated with a web interface (e.g., user Z) may be associated with Internet protocols and/or intermediary devices such as web servers. Office device 100 may connect to network 122 via an Ethernet connection and home device 102 may connect via a wireless connection, such as IEEE 802.11 (i.e., WiFi). Other types of networks such as mobile telephone networks (e.g., voice and/or data) or satellite data networks may be used in combination with or as an alternative to some of the examples described above.

Although some of the figures herein describe photographs, the techniques described herein can be applied to any type of object or data. For example, in some embodiments group albums are used with other types of audio and/or video content besides photographs such as songs, movies, and/or computer generated images or animation. In some embodiments, group albums are used in a professional or commercial setting. For example, a group of graphic artists and can use group albums to collaborate on a collection of images being developed. Or, a graphic artist can make images available to a group of subscribers by inviting them to be members of the artist's group album. As described above, in various embodiments a group album is used in a variety of applications and/or includes a variety of types of content.

Figure 2:
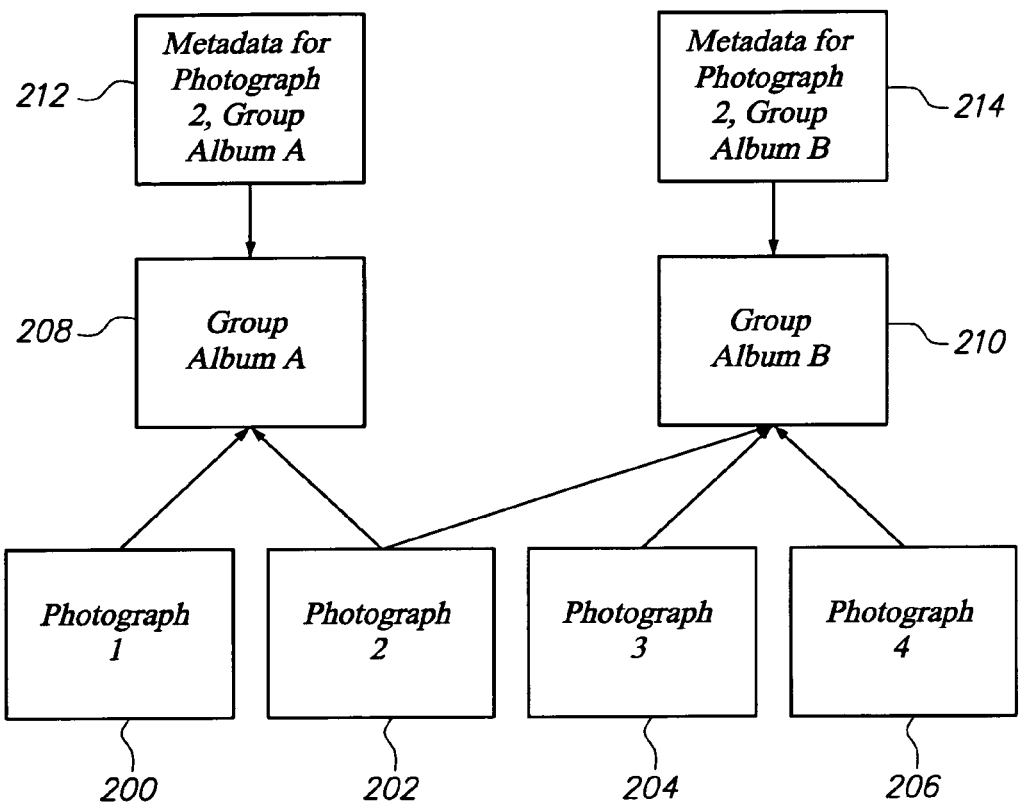
FIG. 2 is a diagram illustrating an embodiment of tracking which photograph(s) correspond to which group album(s).

FIG. 2 is a diagram illustrating an embodiment of tracking which photograph(s) correspond to which group album(s). In this example, a photograph can correspond to one or more group albums, and a group album can include one or more photographs. In this example, each photograph points to or otherwise includes a reference to group albums that are associated with that photograph. For example, photograph 1 (200) references group album A (208), photograph 2 (202) references group albums A and B (208 and 210), photograph 3 (204) references group album B (210), and photograph 4 (206) references group album B (210). In various embodiments, this is implemented in a variety of ways. For example, in some embodiments, there is a list for each photograph that includes group albums associated with that photograph. Other techniques are used in other embodiments. Alternatively, in some embodiments, each group album points to or references photograph(s) that are associated with it.

In some applications, tracking corresponding photograph(s) and group album(s) as shown is desirable. This may be desirable when determining how many group albums a given photograph is associated with. If, for example, each group album were to have a list of associated photographs, each list would have to be searched to determine the number of group albums a given photograph is associated with which may take more time that searching a single list that includes all group albums a given photograph is associated with. In some embodiments, there is some other desired performance and/or design constraint and some other technique appropriate for that application is used (e.g., in some applications, optimizing or otherwise improving determination of the number of group albums a given photograph is associated with is not that useful).

In this example, metadata 212 and 214 are associated with photograph 2 (202). Metadata 212 is associated with group album A and metadata 214 is associated with group album B. Each piece of metadata points to or otherwise references its corresponding group album. In some embodiments, a given piece of metadata can point to or reference more than one group album. In various embodiments, metadata comprises a variety of information associated with a photograph including (but not limited to) a tag, timestamp, file name, captions, etc. In some embodiments, a change or an edit to a photograph is implemented in metadata. For example, a user may want to rotate a photograph (e.g., from landscape orientation to portrait orientation or vice versa). In some embodiments, rather than generating a new image file (e.g., a new JPEG file) a change is implemented in metadata. For example, a new piece of metadata (e.g., with a new rotation) is created to implement the change. In some applications this is desirable since a new piece of metadata may be smaller than a new image file and it may be possible to use less bandwidth, memory, or some other resource when storing and/or synchronizing information.

In some embodiments, a data store associated with a central repository tracks corresponding photographs/metadata and group albums using the example technique. In some embodiments, a local store associated with a device via which a user accesses a group album uses the example technique to track corresponding group albums and photographs/metadata.

Figure 3:
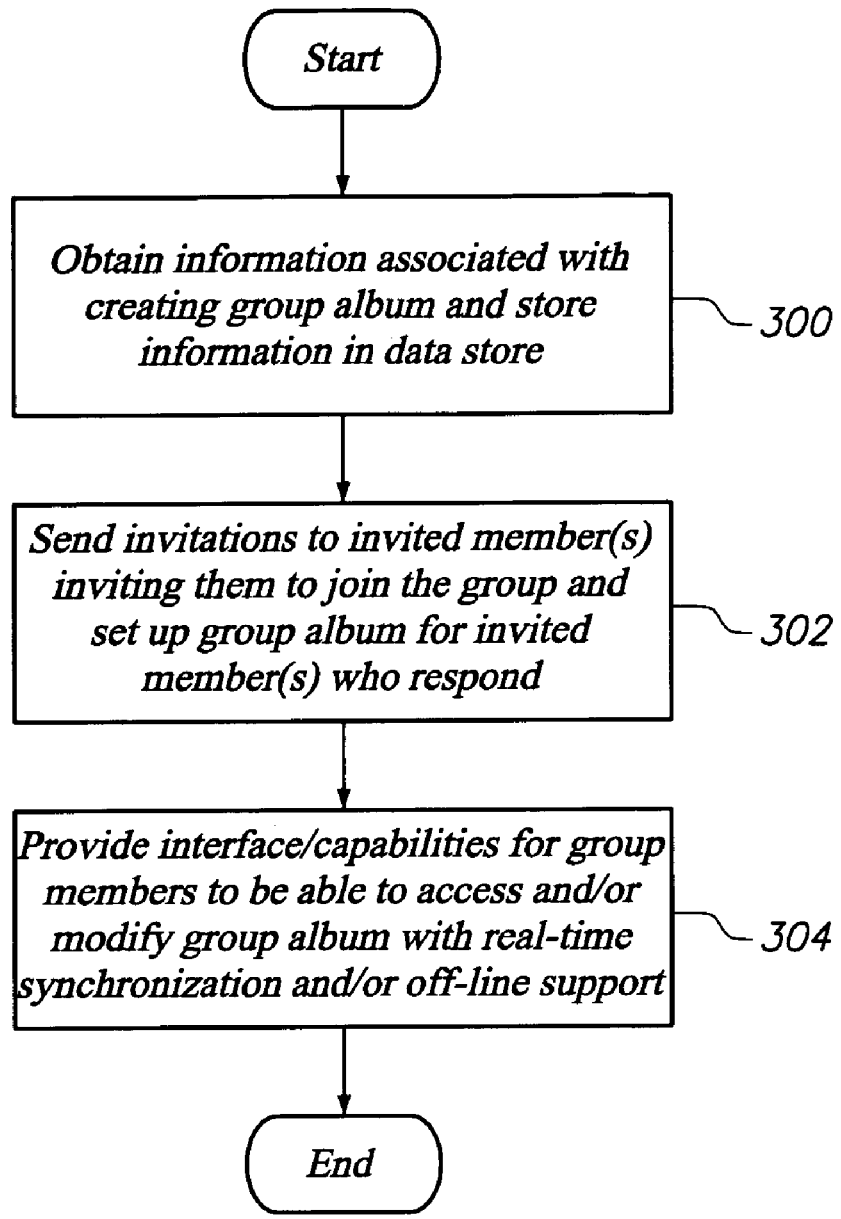
FIG. 3 is a flowchart illustrating an embodiment of a process to provide a user with access to a group album with real-time synchronization and off-line capabilities.

FIG. 3 is a flowchart illustrating an embodiment of a process to provide a user with access to a group album with real-time synchronization and off-line capabilities. In some embodiments, some or all of the process shown is performed by an application downloaded to a device. In some embodiments, some or all of the process is performed via a web interface. In some embodiments, some steps are performed by multiple devices while other steps are performed by a single device.

At 300, information associated with creating a group album is obtained and information is stored in a data store. For example, some or all of this information may be obtained from a creator of a group album. A creator may, for example, provide a name of a group album, specify an initial collection of photographs to include in the group album, specify members to be invited, set group album parameters or settings, etc. In some embodiments, some information is stored only at a data store associated with a central repository and is not stored in a local store (e.g., last time group album was viewed by each member, old versions or states of a group album, etc.)

At 302, invitations are sent to invited member(s) inviting them to join the group and group albums are set up for invited member(s) who respond. For example, in some embodiments, an email is sent to invited members informing them they have been invited to join a group album. An invitation may include any appropriate information and in some embodiments includes a configurable or otherwise selectable set of information (e.g., a welcome message written by an album creator). In various embodiments, an invited member is able to respond via a variety of response channels. For example, in some embodiments, an invitation includes instructions to download an application (if not already installed) and/or set up a user name and password (e.g., via a website, an exchange of emails, and/or an application). In some embodiments, setting up a group album for invited members who respond includes creating a local store associated with a group album and/or installing an application on a user's device (e.g., a mobile phone or PDA).

At 304, an interface/capabilities are provided for group members to be able to access and/or modify a group album with real-time synchronization and/or off-line support. In some embodiments, a group album application is downloaded to a device to provide an interface and/or capabilities. In some embodiments, a group album application is configured to operate in an off-line mode when access to a central repository (e.g., via a network connection) is not available and operate in an on-line mode when the central repository is available. In some embodiments, real time synchronization occurs in substantially real time so that a change is presented to all members who are connected to a central repository within, for example, a few seconds.

Figure 4A:
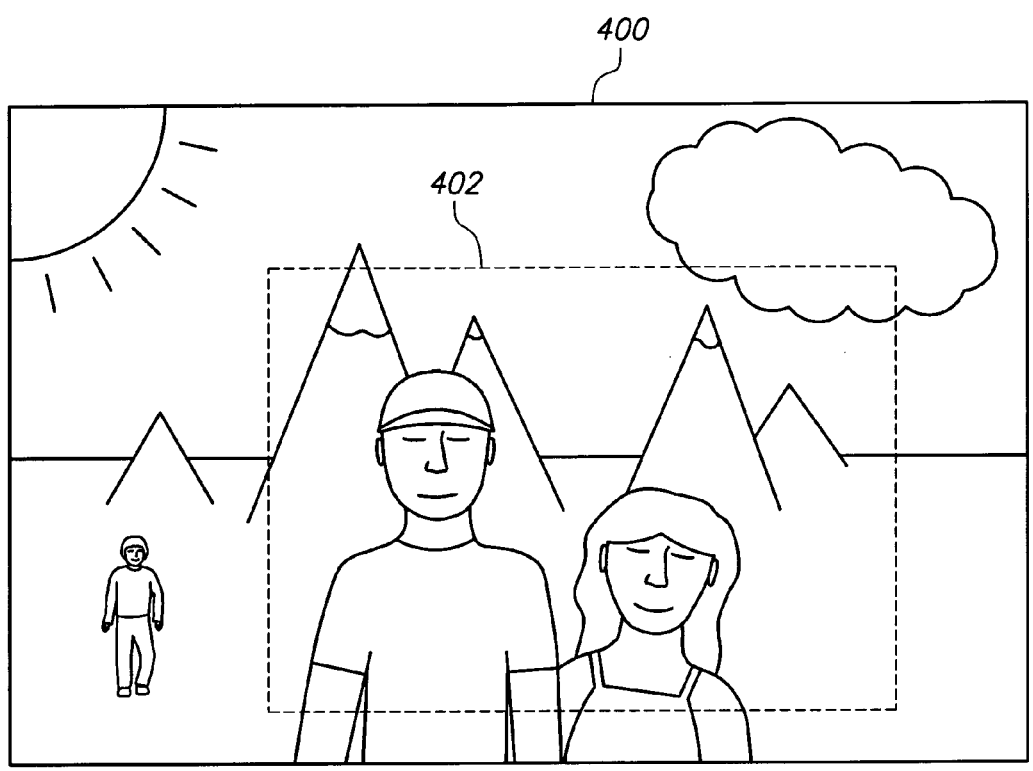
FIG. 4A is a diagram illustrating an embodiment of a photograph that is cropped.

FIG. 4A is a diagram illustrating an embodiment of a photograph that is cropped. In the example shown, original image 400 is an unedited or original version of a photograph included in a group album. At some point in time, one of the members decides to crop the photograph. For example, a member may want to remove the person walking in the background, or the member may want a close up of the two people in the center of the image. Dotted lines indicate the new border corresponding to cropped image 402.

In some embodiments, a member uses tools, commands, or operations provided by a group album application to crop or perform some other operation on a group album. In some embodiments, a member changes the color, size, or orientation of a photograph. In some embodiments, a change is performed on some other data or object in a group album besides a photograph (e.g., a comment, a tag, a file name, etc.).

In some embodiments, a change to an object associated with a group album (e.g., cropping) is described, recorded, or synchronized using metadata. For example, rather than generating a new image file (e.g., a new JPEG or GIF file) with the new boundaries of cropped image 402, in some cases metadata is used to record the boundaries associated with cropped image 402 and an image file that contains original image 400 is maintained. In some embodiments, when displaying or presenting cropped image 402 to a member, an image file associated with original image 400 is opened and the original or unedited image is processed, filtered, or otherwise manipulated to obtain cropped image 402. In some embodiments, multiple edits or modifications are performed on an image. Processing may output data in any format. For example, in some embodiments, after processing, a data stream is produced that is used to render or display cropped image 402. In some embodiments, a new image file is written that contains the cropped image. For example, to display cropped image 402 via a web interface, a new file may be generated.

Recording or otherwise capturing changes to a group album in metadata may be desirable in some applications. For example, it may be possible to conserve resources, such as network or bandwidth resources during synchronization. In embodiments where changes are captured in metadata, it is possible to synchronize a group album across devices by exchanging metadata rather than transmitting an image file each time a change is made. This may be desirable if a network connection is bandwidth limited (e.g., via a telephone modem connection as opposed to a faster DSL or cable modem connection) or a pay-per-byte network is used (e.g., a mobile telephone data network). In some cases, image files are relatively large compared to metadata (e.g., megabytes versus kilobytes) and network resources may be conserved by exchanging metadata rather than an image file.

In some applications, using metadata is useful if changes are permitted to be rolled back or undone by members of a group album. For example, by storing a cropping or other change in metadata, the edges of original image 400 are still available should the cropping be undone or adjusted. If, on the other hand, a new image file were generated corresponding to cropped image 402, the image file for original image 400 may have to be saved (e.g., in case the cropping is undone), which may be undesirable since storing more files consumes more storage resources or the edges of original image 400 may be lost, which may be undesirable since undo capabilities or features may be desired.

Figure 4B:
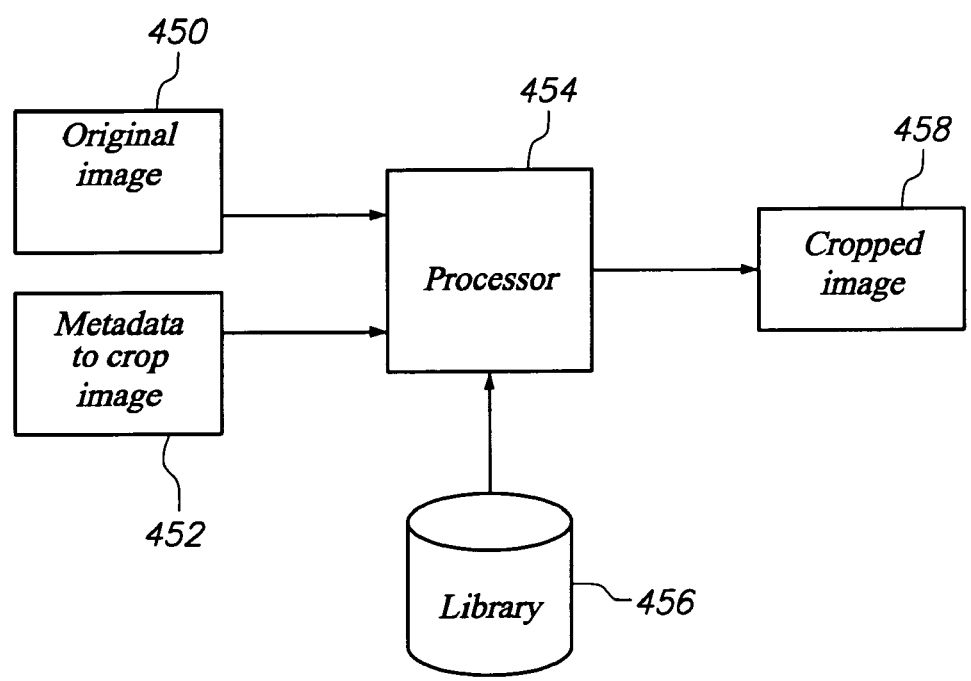
FIG. 4B is a diagram illustrating an embodiment of a system to generate a cropped image using metadata.

FIG. 4B is a diagram illustrating an embodiment of a system to generate a cropped image using metadata. In the example shown, changes or edits to a group album (in this example, cropping a photograph) are stored in metadata. In some embodiments, metadata and a corresponding image file are stored in a local store on a device. In some embodiments, when a local store on a device and a data store on a central repository synchronize, only the metadata is exchanged. That is, in some embodiments, an image file is only exchanged between a device and central repository when a photograph is first added to a group album.

Original image 450 corresponds to an original or pre-modified photograph in a group album, such as original image 400 prior to cropping. In some embodiments, data for original image 450 is obtained from an image file, such as a JPEG or GIF file. In some embodiments, metadata describes or includes a transformation, change, or edit that is applied to original image 450 in order to obtain cropped image 458. In this example, metadata 452 contains the new boundaries of cropped image 458.

Processor 454 receives or otherwise inputs original image 450, metadata 452, and library 456. In this example, library 456 defines fields in metadata 452 and how these fields should be properly processed or parsed. For example, in some embodiments each field is assigned a field code that identifies the particular field. For each fields, one or more parameters or values are permitted or defined using library 456. For example, library 456 may define a metadata field having a field code of 1 to be the cropping field. In some cases, four parameters are permitted for the cropping field, corresponding to the four points that define the corners of the cropped image. In some embodiments, library 456 includes definitions and/or processing instructions for other fields. In some cases, a field may be defined by library 456 but is not necessarily included in metadata 452, for example because that edit or modification has not been performed on a photograph.

In some embodiments, library 456 is updated over time, for example to define new fields, change how a field is handled, add a new parameter to an existing field, etc. This may be useful in adding new or improved features, capabilities, or operations related to a group album.

In various embodiments, cropped image 458 is output in a variety of formats. In some embodiments, cropped image 458 is output as a data stream used by an application to render or otherwise display the cropped image. For example, referring to the example of FIG. 1, in some cases, original image 450 and metadata 452 are stored in local store 107 and displayed to user X using processor 454 and library 456. In some embodiments, a new file is written or otherwise generated that corresponds to cropped image 458. In some embodiments, a new file is used to support access to a group album via a web interface. In some embodiments, a file corresponding to an edited image is only written to or stored on a central repository. Referring to FIG. 1, in some embodiments, a file that corresponds to cropped image 402 is only written to data store 112 on the central repository and/or is used with web interface 124. In some embodiments, local stores 107, 117, and 123 only contain images files corresponding to original or unedited photographs, and changes are stored in those local stores using metadata.

Figure 5:
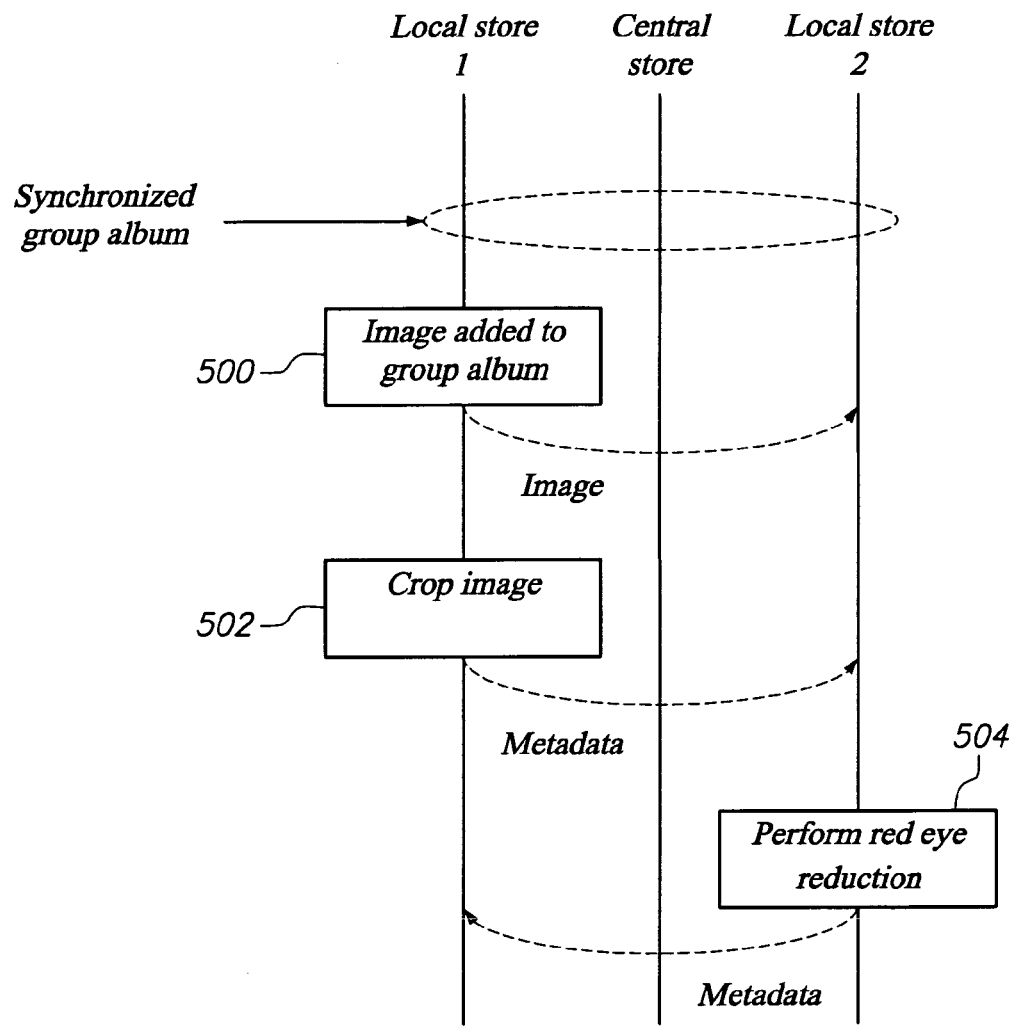
FIG. 5 is a diagram illustrating an embodiment of exchanging metadata to propagate a change across devices or stores of a group album system.

FIG. 5 is a diagram illustrating an embodiment of exchanging metadata to propagate a change across devices or stores of a group album system. In the example shown, two devices with local stores remain on-line over the example period of time and synchronization occurs in substantially real time across devices. Each local store is stored on a device via which a member accesses a group album. For example, a device may be a mobile telephone, a computer, a PDA, etc. In some cases, devices are associated with different members of a group album. In some cases, the devices on which local stores 1 and 2 are stored are owned by or are otherwise associated with the same member.

At local store 1, an image is added to a group album at 500 and an image file is sent to the central store. For example, one or more synchronization engines may send a copy of the image file from local store 1 to the central store. A copy is then sent to local store 2 from the central store.

The image is cropped at 502 at local store 1. Metadata that includes information about the cropping is sent or copied to the central store. From the central store, metadata is sent to local store 2. Similarly, at 504, red eye reduction is performed at local store 2 and metadata is transmitted or copied to the central store, and then to local store 1. In this example, each of the local stores has a copy of the metadata and a copy of the image file so that the most recent version of an image can be presented or displayed (e.g., the original version, the cropped version, and then the cropped and red-eye reduced version as time progresses). In some cases, metadata exchanged at 502 and/or 504 are much smaller compared to an image file exchanged at 500. For example, in some case an image file has a size on the order of megabytes whereas metadata has a size on the order of kilobytes.

In various embodiments, metadata sent at 502 and/or 504 is implemented, exchanged, organized, or stored in a variety of ways. In some embodiments, each type of change corresponds to a different piece of metadata. For example, after having red eye reduction performed at 504, in some embodiments each store includes an image file and two pieces of metadata, the first associated with cropping and the second associated with red eye reduction. Alternatively, in some embodiments each photograph has a single piece of metadata associated with it comprising of a variety of fields and each field corresponds to a different type of change. For example, one field corresponds to cropping and another corresponds to red eye reduction.

In some embodiments, local stores 1 and 2 only have the most recent versions of metadata needed to properly display a group album in an off-line mode. In some embodiments, previous versions, values or parameters of metadata are stored at a central repository in case a member wants to undo a change or edit. For example, some mobile telephones or PDAs are memory limited and it may be undesirable to store previous versions of metadata or photographs that have been deleted. In some applications it is acceptable to only permit undo operations when a central data store is accessible. In some embodiments, it is possible to undo a change without undoing a change performed later. For example, some systems are configured so that it is possible to undo the cropping at 502 without undoing the red eye reduction at 504. In some cases, a device associated with local store 1 or 2 is battery powered and transferring unnecessary information wastes battery life.

In various embodiments, exchange of an image file (e.g., after 500) and/or exchange of metadata after 502 or 504) is initiated or triggered by various events or entities. In some embodiments, a user makes changes and metadata is not sent to another store until a user presses a button labeled "Update group album," "Synchronize," or "Accept Changes." In some applications, this is attractive since network resources are not wasted. For example, if a member tried out four different croppings at 502, the first three exchanges of metadata would not be useful and bandwidth would be wasted. In some embodiments, transfer of an image file is triggered by a different entity or event than transfer of metadata. For example, in some embodiments, an image file is sent automatically without requiring user direction or interaction, whereas metadata is not sent until a member commands it.

FIG. 6A is a diagram illustrating an embodiment of metadata stored in a local store on a device. In the example shown, each photograph in a group album has a piece of metadata similar to metadata 600 associated with it. In the example shown, metadata 600 includes fields only for changes that have been performed or applied to an associated photograph. Photograph 1 in this example has been rotated, red eye reduced, and cropped. Another photograph in the group album that has not been edited may not necessarily include fields 1-3. In some embodiments, a library defines or describes the format of fields in metadata 600 and a processor opens or reads such a library to properly process metadata 600. In some embodiments, other types of changes besides those shown in this example are described or captured using metadata. For example, captions, black/white vs. color, and/or borders or frames are described in some embodiments using fields in metadata 600.

In this example, fields 1-3 in metadata 600 each have their own revision number, timestamp, unsynchronized bit, and value(s). For example, a member may perform red eye reduction on photograph 1 and that change is assigned a revision number of 1. If another member subsequently changes the first member's red eye reduction (e.g., because the first member is not as good as the second member in removing red eye) the change made by the second member in some embodiments is assigned a revision number of 2. In some embodiments, revision numbers are distributed or allocated by a central repository and a local store is not permitted to increment a revision number. For example, the revision number may reflect the last time a local store was synchronized with a data store on a central repository.

The unsynchronized bits in this example are used to track whether a particular field has changed during an off-line mode. For example, if a member made no changes while off-line, none of the unsynchronized bits would be set in some embodiments. In some embodiments, unsynchronized bits are only stored on local stores and are not stored in metadata at a central repository. In some embodiments, having an unsynchronized bit for each field in metadata 600 enables a process to detect or otherwise identify what portions or fields of metadata 600 have changed when a device goes on-line and a central repository becomes available. In some embodiments, only those fields in metadata 600 with the unsynchronized bit set are transferred or sent to a central store.

Alternatively, in some embodiments, a single unsynchronized or dirty bit is used for all of metadata 600. In some embodiments, all of metadata 600 is sent to a central repository if that single unsynchronized or dirty bit is set.

In this example, timestamps are used to record when a change on a local store was performed. In some embodiments, devices have access to an accurate and/or common clock source (e.g., a network clock) and the timestamp recorded uses this clock. In such embodiments, it may be possible to eliminate revision numbers. Conversely, in some applications, an accurate clock is not available and/or is not available during an off-line mode; in some embodiments, timestamps are not included in metadata 600.

Each of fields 1-3 has one or more values; one field may have a single value or parameter while another field has multiple values. For example, in some embodiments, an ellipse is used to identify a region of a photograph that red eye reduction is applied to. In some embodiments, values in a red eye reduction field (i.e., field 2) are the x-y coordinates of the center of the ellipse, the major and minor axes of the ellipse, and the color or degree of reduction for that region. In some embodiments, some other shape is defined (e.g., using a library) and the parameters or values for a red eye reduction field are different.

In some embodiments, when displaying a group album to a member, the values for each field are accessed by a processor and are used to modify an original image. For example, the original image of photograph 1 is rotated, red eye reduced, and cropped using the values in each of the respective fields of metadata 600. In some embodiments, values in metadata 600 are scalable or are able to be used even if another field (in) directly affects a field. For example, cropping may affect the position of eyes depicted in a cropped photograph. In some embodiments, the location and/or size of an ellipse describing the location of eyes in a photograph is scalable or is able to be transformed or modified such that it is usable even if a photograph is cropped or some other change is performed.

In various embodiments, value(s) of a field comprise a variety of data types. For example, values may be Boolean values, parameters, settings, coefficients of some function, coordinates, integers, strings, pointers, etc. In some embodiments, a change is not necessarily to the photograph itself. For example, in some embodiments, metadata is used to add a caption to a photograph, tag a photograph, specify the name of an image file, etc.

In some embodiments, metadata varies from local store to local store. For example, in some embodiments, one device has less resources or processing capabilities compared to another device and metadata is stored differently on a device by device basis. In some embodiments, information for only some photographs in a group album and/or only a subset of information for a given piece of metadata is stored on a memory constrained device. For example, some mobile telephones have a limited amount of memory and if a group album is very large, image files and corresponding metadata may only be stored for a few photographs in the group album. If a member wants to view or otherwise access a photograph for which there is no image file or metadata, the information is then obtained and some stored information may be deleted. Other devices that are less memory constrained may not necessarily be thus configured.

FIG. 6B is a diagram illustrating an embodiment of metadata stored in a data store on a central repository. In the example shown, metadata 650 is corresponds to photograph 1 (as does metadata 600), but metadata 600 and 650 contain different sets of information. In some embodiments, techniques in addition to or as an alternative to the examples described in these figures are used.

As with metadata 600, metadata 650 includes revision numbers and timestamps for fields 1-3. In some cases, the revision number and/or timestamp stored in a data store on a central repository (e.g., metadata 650) may not match the revision number and/or timestamp stored in a local store on a device (e.g., metadata 600). For example, if a member was off-line for a relatively long period of time, he may have missed some changes that were synchronized across on-line or connected devices, and his revision number may be older. In some cases, the revision number and/or timestamp stored in 650 is the same as that stored in 600, but a change has been performed. For example, in some embodiments, local stores or device are not permitted to increment revision numbers on their own while off-line and changes are identified or detected using an unsynchronized or dirty bit.

Metadata 650 includes the member who made a last change for each field, and the device from which the last change was made for each field. In this example, this information is not made available or otherwise presented to members and is thus not included in metadata 600. In some cases, a group album application or user interface presents this information to members and in such embodiments this information is included in metadata 600 and/or is synchronized.

In some embodiments, a central repository has more storage available than a device and thus more information is able to be stored if so needed. In some embodiments, older information (e.g., associated with older revision numbers) is saved in a data store on a central repository. For example, in some embodiments, older values for each revision number of each field are saved in the event a member wants to undo or roll back an edit. In some embodiments, only changes or edits that are selected by a member are undone.

Metadata 600 and 650 in the above figures are examples of metadata used to record or store changes. In some embodiments, information in addition to or as an alternative to the examples shown in metadata 600 and/or 650 is used.

Figure 7:
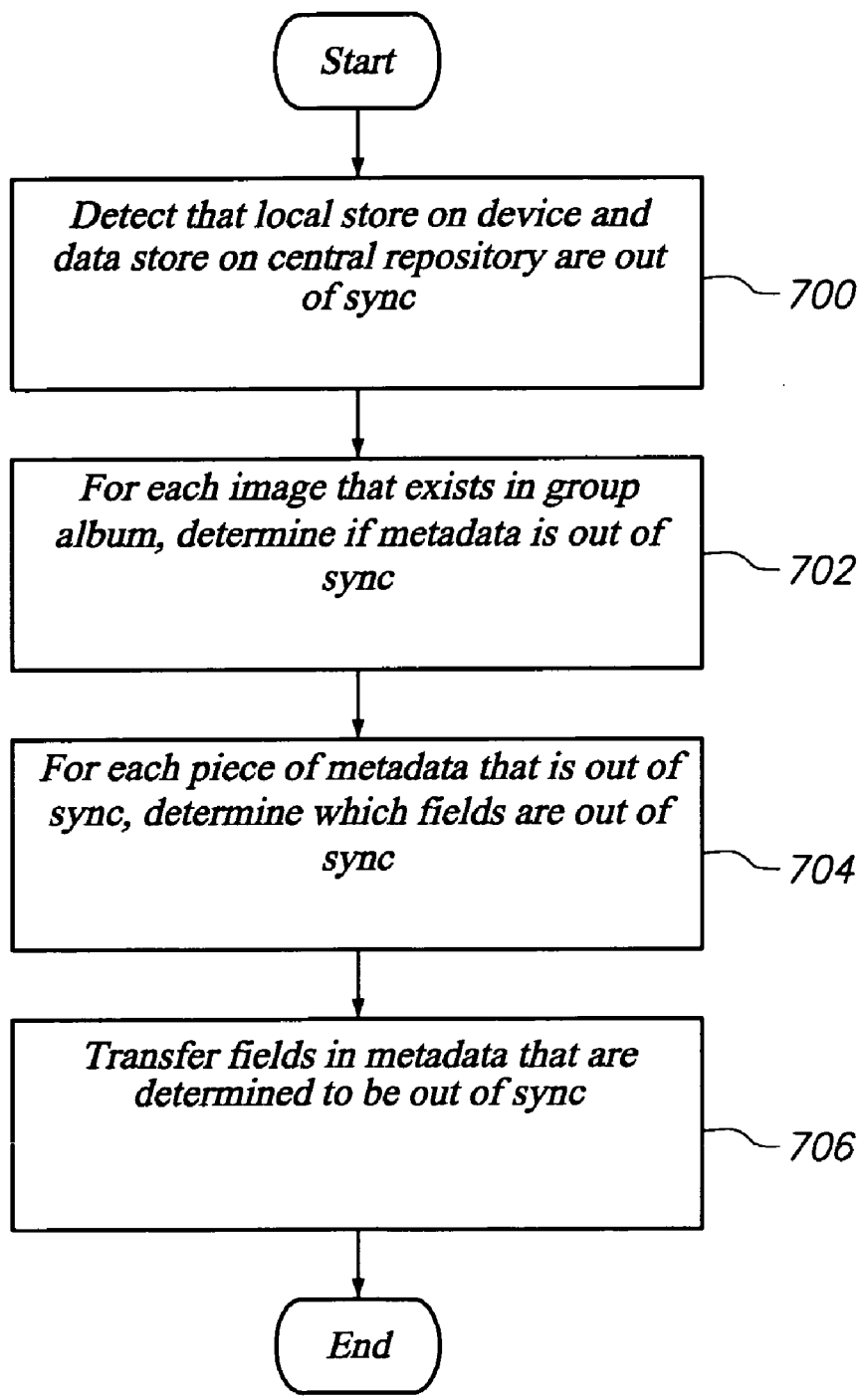
FIG. 7 is a flowchart illustrating an embodiment of a process for exchanging only fields in metadata that have changed for those photographs in a group album that have been modified.

FIG. 7 is a flowchart illustrating an embodiment of a process for exchanging only fields in metadata that have changed for those photographs in a group album that have been modified. In some embodiments, a member is modifying a group album while on-line and the example process is performed. In some embodiments, a member makes a change to a group album while off-line and the example process is performed when the central repository becomes available (e.g., when a network connection is established). In some embodiments, the process is performed by a synchronization engine.

At 700, it is detected that a local store on a device and a data store on a central repository are out of sync. In some embodiments, detection at 700 is activated or triggered by a user. For example, in some embodiments, a user presses a button via a group album interface marked "Synchronize." In some embodiments, some action by the user such as saving to a local store triggers detection at 700. In some embodiments, detection at 700 occurs automatically. For example, a synchronization engine associated with a local store and a synchronization engine associated with a central data may communicate to automatically detect this.

At 702, for each image that exists in a group album, it is determined if metadata is out of sync. In some embodiments, if at least one unsynchronized bit in metadata is set, it is determine that the metadata is out of sync.

At 704, for each piece of metadata that is out of sync, it is determined which fields are out of sync. In various embodiments, unsynchronized bits, timestamps and/or revision numbers are used to determine which fields have changed for a particular piece of metadata. For example, some group album systems are configured to have unsynchronized bits and/or revision numbers on a per-field basis.

At 706, fields in metadata that are determined to be out of sync are transferred. For example, referring to the example of FIG. 5, a cropping field in metadata is exchanged at 502 and a red eye reduction field is exchanged at 504.

In some cases, a non-trivial amount of time is spent transferring an image file, for example when a photograph is first added to a group album. In some embodiments, techniques are used to improve or disguise the amount of time it takes to transfer an image file so that a user is not kept waiting when installing or setting up a group album, or when a new picture is added to a group album.

Figure 8:
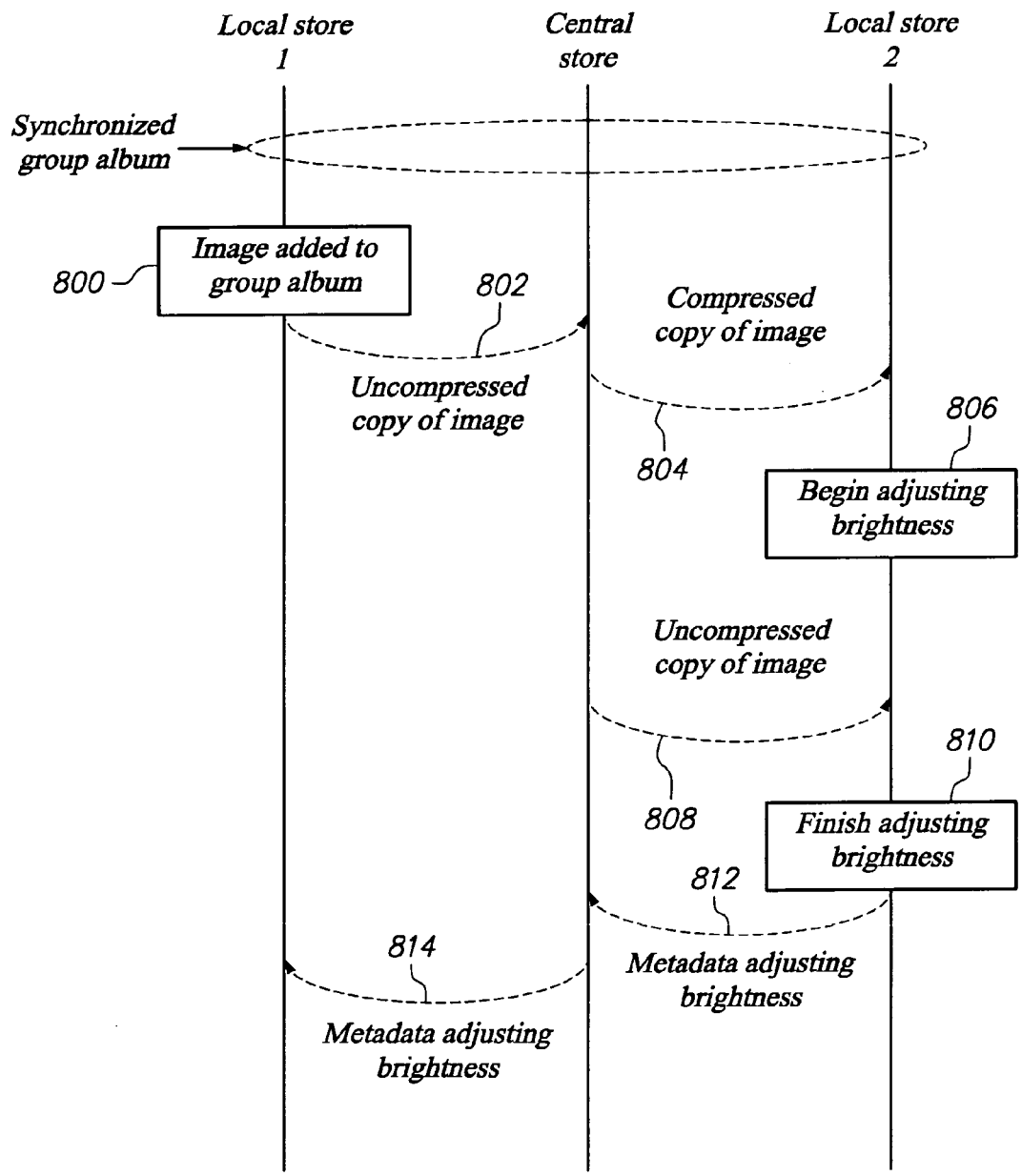
FIG. 8 is a diagram illustrating an embodiment of exchanging a compressed copy prior to exchanging an uncompressed copy when adding an image.

FIG. 8 is a diagram illustrating an embodiment of exchanging a compressed copy prior to exchanging an uncompressed copy when adding an image. In the example shown, a group album is synchronized in substantially real time across a central store and local stores 1 and 2. At 800, an image is added to a group album at local store 1. For example, a member using the device on which local store 1 is located may add a photograph to the group album.

In the example shown, an uncompressed copy of the image is passed from local store 1 to a central store at 802. For example, a JPEG file is passed to a central store that has the full resolution of the image. (Alternatively, in some embodiments, a compressed copy is passed from local store 1 to the central store first.) At 804, a compressed copy of the image is passed from the central store to local store 2. A compressed copy of an image is smaller than an uncompress copy of an image and can be obtained using any appropriate technique. In some embodiments, a compressed copy has lower resolution, fewer pixels, or is encoded using lossier techniques compared to an uncompressed copy.

At local store 2, a member is able to access and operate on the added image using the compressed copy of the image. A member at local store 2 begins adjusting the brightness of the picture at 806. In some cases, a member at local store 2 is able to add a caption, adjust the color of some or all of a picture, add a border, etc. In some cases, the difference in transfer or download times between a compressed copy and an uncompressed copy is noticeable or significant. By transferring a compressed copy first, a member may be able to start viewing and/or operating on a photograph without having to wait as long.

While a member is adjusting the brightness, an uncompressed copy of the image is passed from the central store to local store 2 at 808. In this example, the compressed copy of the image is swapped out at an appropriate time and is replaced with the uncompressed copy. Changes in the brightness that were made or done by a member using a compressed copy are still valid and are applied or transferred to the uncompressed copy. In some embodiments, a member is notified or queried about a swapping.

At 810, a member finishes adjusting brightness. Metadata associated with the adjusted brightness is sent from local store 2 to the central store at 812. For example, in some embodiments, metadata sent at 812 includes a region that a change in brightness applies to (e.g., described using coordinates) and/or the degree or quantization of brightness for a region. At 814, metadata is passed from central store to local store 1. Using this received metadata at local store 1, a display or user interface is able to duplicate the change made at local store 2 without having to transfer an image file from local store 2 to local store 1 via the central store.

In some embodiments, some processing such as a best fit process, interpolation, or other mapping is performed as appropriate to transfer changes to an uncompressed copy. For example, changes made when working with a compressed copy may have been made or recorded using parameters or characteristics that pertain to the compressed copy but not necessarily to the uncompressed copy. In some embodiments, some processing is used to handle a difference in resolution or a difference in the number of pixels.

In this example, transferring a compressed copy first and then an uncompressed copy is performed automatically by a group album application. That is, in this example, a user does not need to interact with or explicitly command a group album application to transfer copies as described. In some embodiments, a user has some degree of control over this. For example, local store 2 may be on a mobile telephone and a transfer of information may occur over a pay-per-byte data network of a mobile telephone provider. In some cases, a user may prefer to have a single copy transferred and in some embodiments a group album interface is configured to accept user instruction regarding transfer of image files. In some cases, a single copy is a compressed copy and in other cases is an uncompressed copy.

In some embodiments, some decision making is performed (e.g., at a central store) to determine when it is appropriate to initially transfer a compressed copy of an image as described. In various embodiments, various criteria or characteristics associated with a group album and/or a group album system are used in making a decision. Some examples of criteria or characteristics include the size of an uncompressed image file, the bandwidth of a network connection, an estimated amount of time to transfer a (un)compressed file, etc. In some embodiments, not all photographs in a group album are sent to a local store. For example, it may be undesirable to store an entire group album on a device that is memory limited. In some embodiments, a decision is made whether to send only a subset of photographs to a local store and, if so, which photographs to send. In some embodiments, a decision is made whether to send a compressed image file in lieu of an uncompressed image file. For example, some devices have displays where the size or resolution makes it acceptable or desirable to send a photograph with lower resolution, lossier encoding, fewer pixels, etc.

Figure 9:
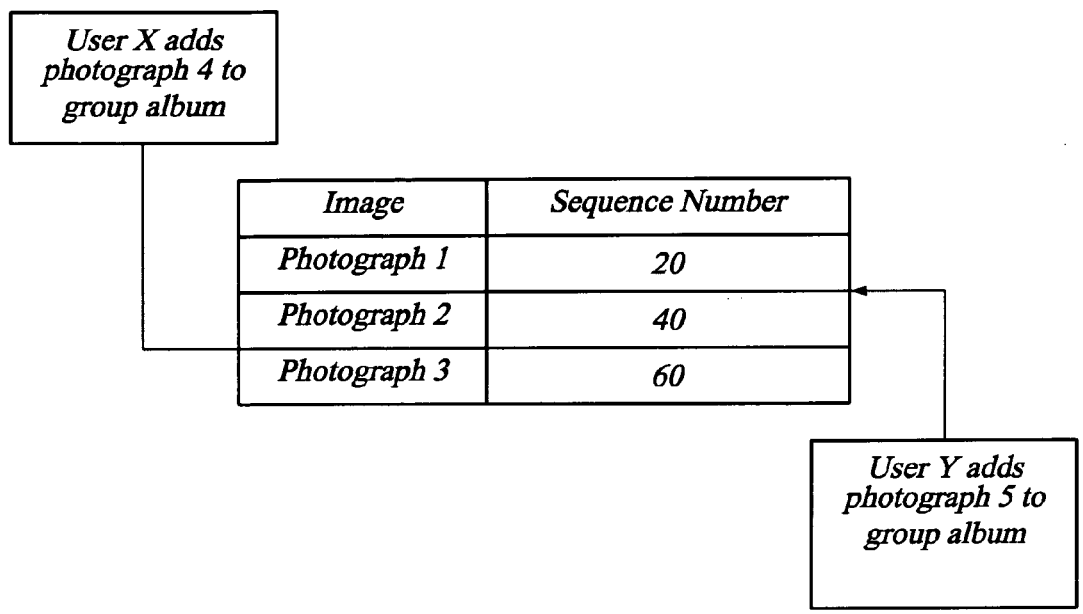
FIG. 9 is a diagram illustrating an embodiment of non-sequential sequence numbers that are used to order photographs.

FIG. 9 is a diagram illustrating an embodiment of non-sequential sequence numbers that are used to order photographs. In the example shown, photographs 1-3 are in a group album and are ordered. In some embodiments, the techniques described herein are applied to an ordered collection of data or objects other than a group of photographs. For example, in some embodiments, a collection includes contact information (e.g., associated with or similar to an address book), files, audio and/or visual data (e.g., static or moving), resources, etc.

In the example shown, the photographs in the example group album are ordered: photograph 1, photograph 2, and photograph 3. In some cases, photographs 1-3 are added to a group album by a group album creator and the creator dictated or otherwise specified the order of the photographs. In some cases, photographs 1-3 are automatically ordered (e.g., based on the times at which the photographs were taken).

In this example, each of photographs 1-3 is assigned a sequence number to track the order of the photographs. In some embodiments, a sequence number is unique within a group album but is not necessarily globally unique across all group albums. That is, in some embodiments, a given sequence number is assigned to at most one photograph within a group album, but a photograph in one group album is permitted to have the same sequence number as a photograph in another group album. In this example, photograph 1 has a sequence number of 20, which is the lowest assigned sequence number and thus photograph 1 is the first photograph. Photographs 2 and 3 have sequence numbers of 40 and 60, respectively, and are thus second and third in the ordering, respectively. Alternatively, in some embodiments, photographs are ordered using sequence numbers in descending order.

The sequence numbers that are assigned to photographs 1-3 are non-sequential numbers such that there are unassigned sequence numbers or gaps between the assigned numbers. For example, the sequence numbers 1-19, 21-39, 41-59, and 61+ are unassigned. In some applications, using non-sequential sequence numbers, where possible, is desirable. In this example, user X adds photograph 4 and places it between photographs 2 and 3 in the ordering. User Y adds photograph 5 to the group album and places it between photographs 1 and 2. The new ordering of the group album is thus photographs 1, 5, 2, 4, and 3. Since there are gaps between the assigned sequence numbers, in some cases processing to change the ordering (e.g., during an addition, removal, or rearrangement) is less complex. For example, if sequential sequence numbers (e.g., sequence numbers 11-13) are assigned to photographs 1-3, conflicts may arise in some cases. If users X and Y add their photograph off-line and user X goes on-line and synchronizes after user Y, in some cases a conflict would arise.

In some cases, fewer sequence numbers need to be adjusted or otherwise changed when using non-sequential sequence numbers. If, for example, a new photograph is added to a group album with sequential sequence numbers, in some cases the sequence numbers of all photographs located after an insertion have to be changed. In the case of a large group album and/or an insertion near the beginning of the group album, this may require a significant amount of processing.

In this example, the sequence numbers that are assigned have a separation of 20 sequence numbers. In various embodiments, an amount of spacing between assigned sequence numbers varies and any appropriate technique can be used to determine gaps between assigned sequence numbers. In some embodiments, there is a range of permitted sequence numbers and an initial collection of photographs are assigned equally distributed sequence numbers. In some embodiments, at least one sequence numbers prior to the first assigned sequence number is reserved when assigning sequence numbers to an initial collection of photographs (e.g., in this figure, the sequence numbers 1-19 are unassigned). At some subsequent time (e.g., when another member adds a photograph to the beginning of an ordering) these sequence numbers in some embodiments are then permitted to be assigned. Similarly, in some embodiments at least one sequence number at the end of a permitted range of sequence numbers is reserved when assigning sequence numbers to an initial collection of photographs (e.g., sequence numbers higher than 61 are unassigned). In some embodiments, these sequence number are subsequently permitted to be assigned at an appropriate time (e.g., when a member later adds a photograph to the end of an ordering).

In some embodiments, some other technique is used to track an ordering and the example process is modified accordingly. In various embodiments, links, pointers, or references are used to record or track the order of photographs in a group album. Referring to the example of this figure, in some embodiments, Photograph 1 points to or references Photograph 2 (i.e., indicating that Photograph 2 follows Photograph 1) and Photograph 2 points to Photograph 3 (i.e., indicating that Photograph 3 follows Photograph 2).

In this example, sequence numbers and corresponding photographs are shown in a table for illustrative purposes. In some embodiments, sequence numbers or other information associated with tracking sequence or order are not necessarily stored in a table. In some embodiments, each sequence number is stored in a corresponding piece of metadata. Photograph 1 may have a piece of metadata associated with it and that piece of metadata includes the sequence number 20. In some cases, when photograph 5 is added to a group album, a new piece of metadata is created and is populated with appropriate information, including the sequence number that is assigned to photograph 5. In some embodiments, a piece of metadata that includes a sequence number is stored in a local store on a device (e.g., so that the group album can be presented with proper ordering even when off-line) and/or is stored in a data store on a central repository (e.g., so that the ordering of photographs can be synchronized across devices or members). In some embodiments, information associated with an order or sequence are stored in a table, database, or file (e.g., that includes sequence numbers and corresponding photographs).

Figure 10:
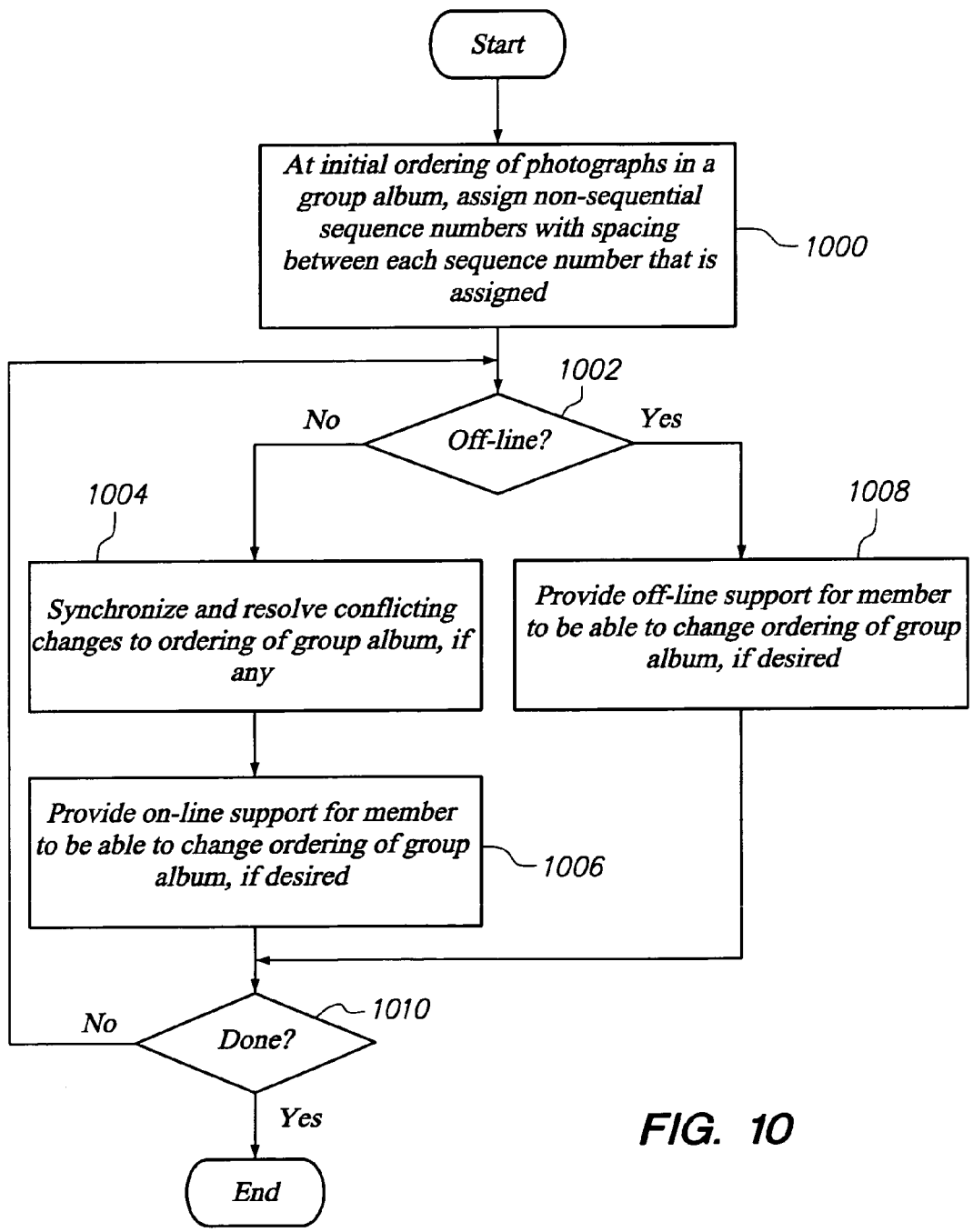
FIG. 10 is flowchart illustrating an embodiment of using non-sequential sequence numbers to track an ordering of photographs in a group album.

FIG. 10 is flowchart illustrating an embodiment of using non-sequential sequence numbers to track an ordering of photographs in a group album. In the example shown, at least some of the sequence numbers that are assigned to photographs in a group album are non-sequential so that there are gaps. In some embodiments, the example techniques are used on a collection of data or objects other than a collection of photographs.

At an initial ordering of photographs in a group album, non-sequential sequence numbers are assigned with spacing between each sequence number that is assigned at 1000. For example, in some embodiments, sequence numbers are assigned so that there are equally spaced gaps between assigned sequence numbers. In some cases, it may not be possible for all photographs in a group album to have non-sequential sequence numbers.

It is determined at 1002 if a process is off-line. If it is not, at 1004 synchronization is performed and conflicting changes to an ordering of a group album, if any, are resolved. In some embodiments, one or more unsynchronized or dirty bits are used to track changes performed while off-line and are cleared when a device goes on-line and synchronization is performed. Such bits are implemented in a variety of ways in various embodiments. In some embodiments there is a single bit for each photograph in a group album, for example that is set regardless of the change (e.g., change in sequence number, change in cropping, change in coloring of photograph, etc.). In some embodiments, each field in a piece of metadata has an unsynchronized bit.

At 1006, on-line support is provided for a member to be able to change an ordering of a group album, if desired. In some embodiments, since changes are performed while on-line, unsynchronized or dirty bits are not set. In some embodiments, since changes are performed while on-line it is assumed that there will be no conflict (e.g., since the group album in synchronized in substantially real time) and no checking is performed on changes to an ordering made by a member.

If a process is off-line, at 1008, off-line support is provided for a member to be able to change an ordering of a group album, if desired. In some embodiments, one or more unsynchronized bits are set when a change is made.

After providing on-line support at 1006 or providing off-line support at 1008, it is determined if a process is done at 1010. If not, it is determined at 1002 whether a process is on-line. In some embodiments, a process ends when a user closes an interface, application, or web browser.

In some embodiments, some portion of the example process is performed at a central repository. For example, in some embodiments, steps 1000, 1004, and/or 1006 are performed at least in part by a process running on a central repository. In some embodiments, some portion of the example process is performed at a device via which a member views and/or manipulates a group album. For example, in some embodiments while in an off-line mode, step 1008 is performed on a device via which a member operates on a group album.

In some embodiments, a change to an ordering is not propagated or otherwise applied across a group album until a central repository accepts or otherwise permits it. For example, although a member may change the ordering of a group album locally during an off-line mode, some or all of the changes may not be kept when the member next goes on-line and synchronizes with a central repository. In some applications, certain undesirable behavior and/or actions is thus avoided or mitigated. For example, it may be acceptable or reasonable for an off-line member to have a change rejected when he goes on-line and synchronizes, whereas it may be undesirable for an on-line member who has already synchronized his change to have the change roll-back.

Figure 11:
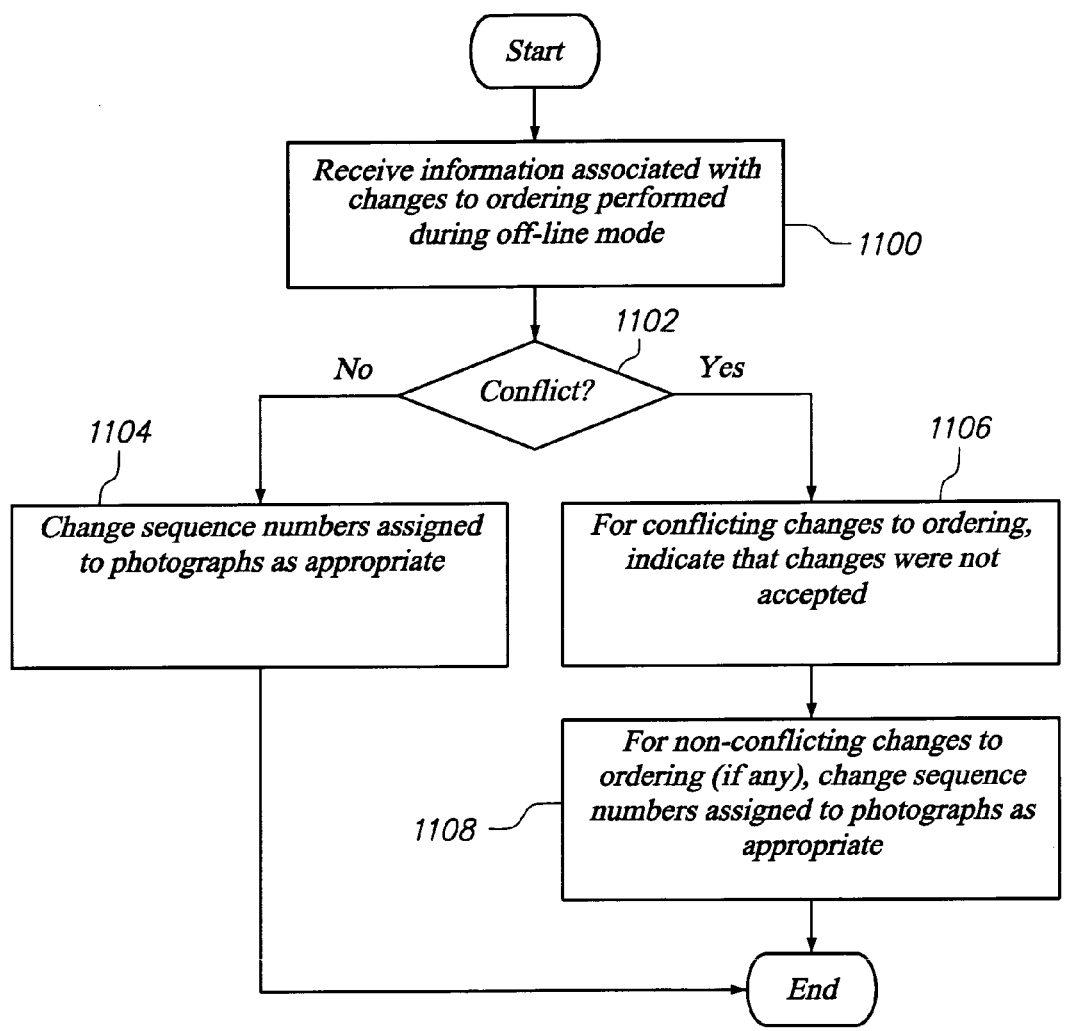
FIG. 11 is a flowchart illustrating an embodiment of a process for resolving conflicting changes to an ordering of a group album.

FIG. 11 is a flowchart illustrating an embodiment of a process for resolving conflicting changes to an ordering of a group album. In the example shown, an off-line change sometimes conflicts with (1) a change that was performed by a member while on-line and/or (2) a change that was performed off-line but was synchronized first. In some embodiments, the example process is used at 1004 to identify and/or resolve conflicts in ordering. In some embodiments, some other process is used.

At 1100, information associated with changes to an ordering performed during an off-line mode is received. In some embodiments, a synchronization engine running on a central repository and a synchronization engine running on a device communicate to exchange change related information.

At 1102, it is determined if there is a conflict. In some cases, a change to the order of a group album made off-line does not necessarily conflict even if the order of the group album changed while off-line. In the example of FIG. 9, the additions of photographs 4 and 5 by users X and Y, respectively, do not conflict. In some cases, a conflict occurs if two members make a change to the same photograph.

If there is no conflict, sequence numbers assigned to photographs are changed as appropriate at 1104. In some embodiments, a process attempts to minimize or reduce the number of sequence number that must be changed. For example, if the order of two consecutive photographs is swapped, in some embodiments, only one of the sequence numbers is changed.

Otherwise, for conflicting changes to ordering, changes that were not accepted are indicated at 1106. A variety of messages, pop-up screens, or other indications can be used to make a member aware that some of his changes were not accepted. For non-conflicting changes to ordering (if any), sequence numbers assigned to photographs are changed as appropriate at 1108. In some embodiments, the same or a similar process is used at 1104 and 1108.

Figure 12:
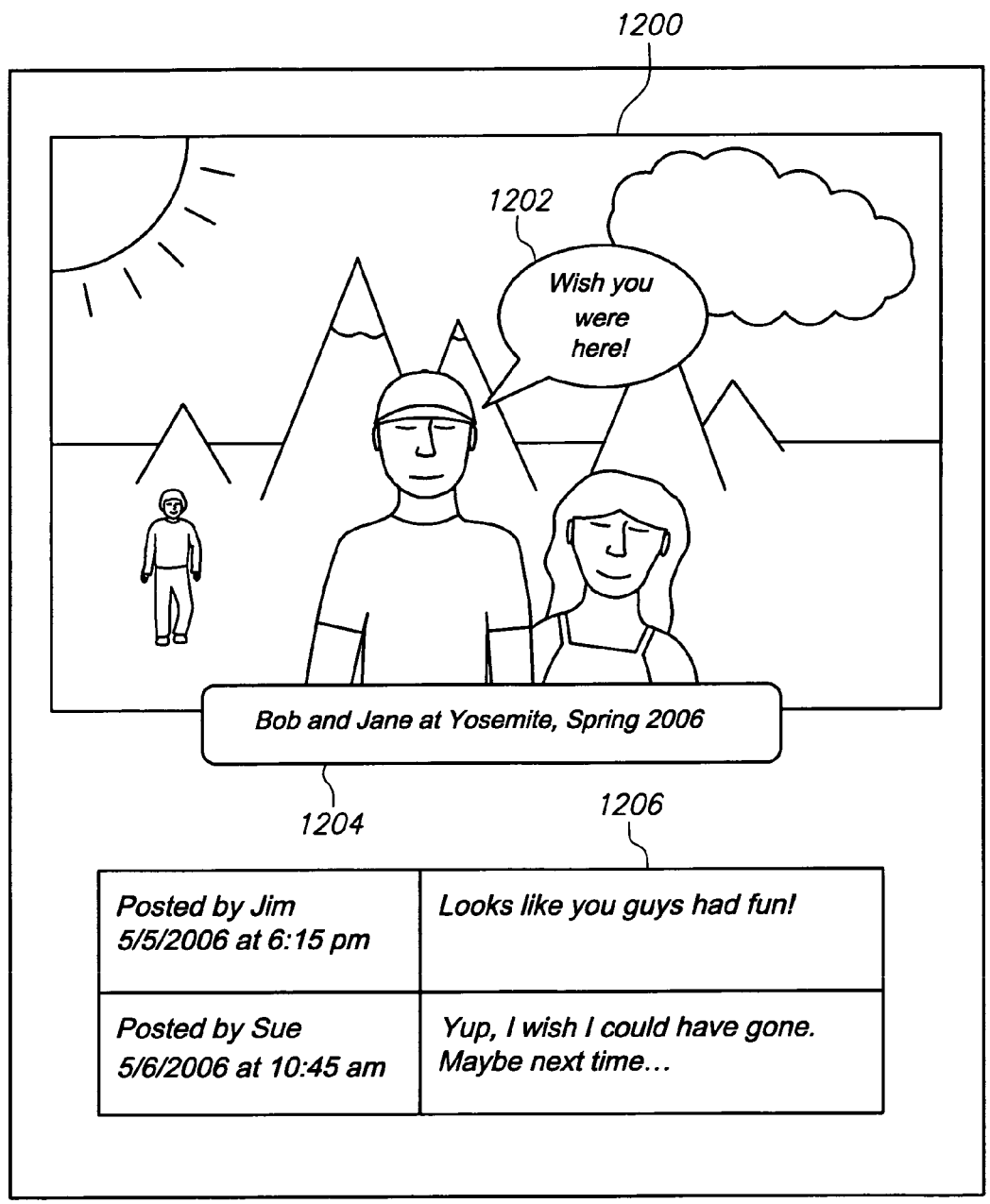
FIG. 12 is a diagram illustrating an embodiment of a photograph in which associated objects are synchronized using metadata.

FIG. 12 is a diagram illustrating an embodiment of a photograph in which associated objects are synchronized using metadata. In the example shown, photograph 1200 is included in a group album and is associated with annotation bubble 1202, caption 1204, and comments 1206. In some embodiments, a comment is associated with a group album as a whole; in some embodiments a comment is associated with a particular photograph in a group album. In some embodiments, the same photograph appears multiple times in different group albums with a different set of comments in each album. In this example, annotation bubble 1202, caption 1204, and comments 1206 are synchronized between devices/users in a group album using metadata. In some embodiments, some other object associated with a photograph or a group album is synchronized using metadata in addition to or as an alternative to a caption, comment, or annotation.

In this example, Jim posts the first comment included in comments 1206. In some embodiments, metadata associated with Jim's comment is exchanged between a local store associated with Jim and a data store (e.g., on a central repository). Local stores associated with other devices or members are synchronized (e.g., in substantially real time) with the data store. For example, metadata is exchanged from the data store to each of the local stores so that each device is able to display Jim's comment even, for example, if a device goes off line. In some embodiments, Sue's comment is in a similar manner synchronized using metadata. In some embodiments, metadata is similarly used to synchronize annotation bubble 1202 and caption 1204 across the group album.

In some embodiments, metadata includes information to be displayed. For example, in some embodiments, metadata associated with annotation bubble 1202 includes, "Wish you were here," metadata associated with Jim's comment in comment 1206 includes "Looks like you guys had fun," and metadata associated with caption 1204 includes "Bob and Jane at Yosemite, Spring 2006." In some embodiments, metadata includes a setting or parameter. For example, members of a group album may be able to specify alignment, line spacing, formatting, font color, font type, and/or font style (e.g., bold, italics, underline, etc.) when adding an annotation, caption, or comment. In some embodiments, position, location, shape, or size information is included in metadata. For example, in some embodiments, a member is able to select a tail for an annotation bubble (e.g., a linear, bubbly, or triangular tail), is able to specify a shape (e.g., an oval or a rounded rectangle for an annotation bubble or a caption), is able to resize or otherwise specify a dimension or aspect ratio, and/or is able to specify a location or position (e.g., within a page or photograph).

In some embodiments, some feature or service is offered that synchronizes changes to images using metadata. The following is one example in which an image editing service is offered.

Figure 13:
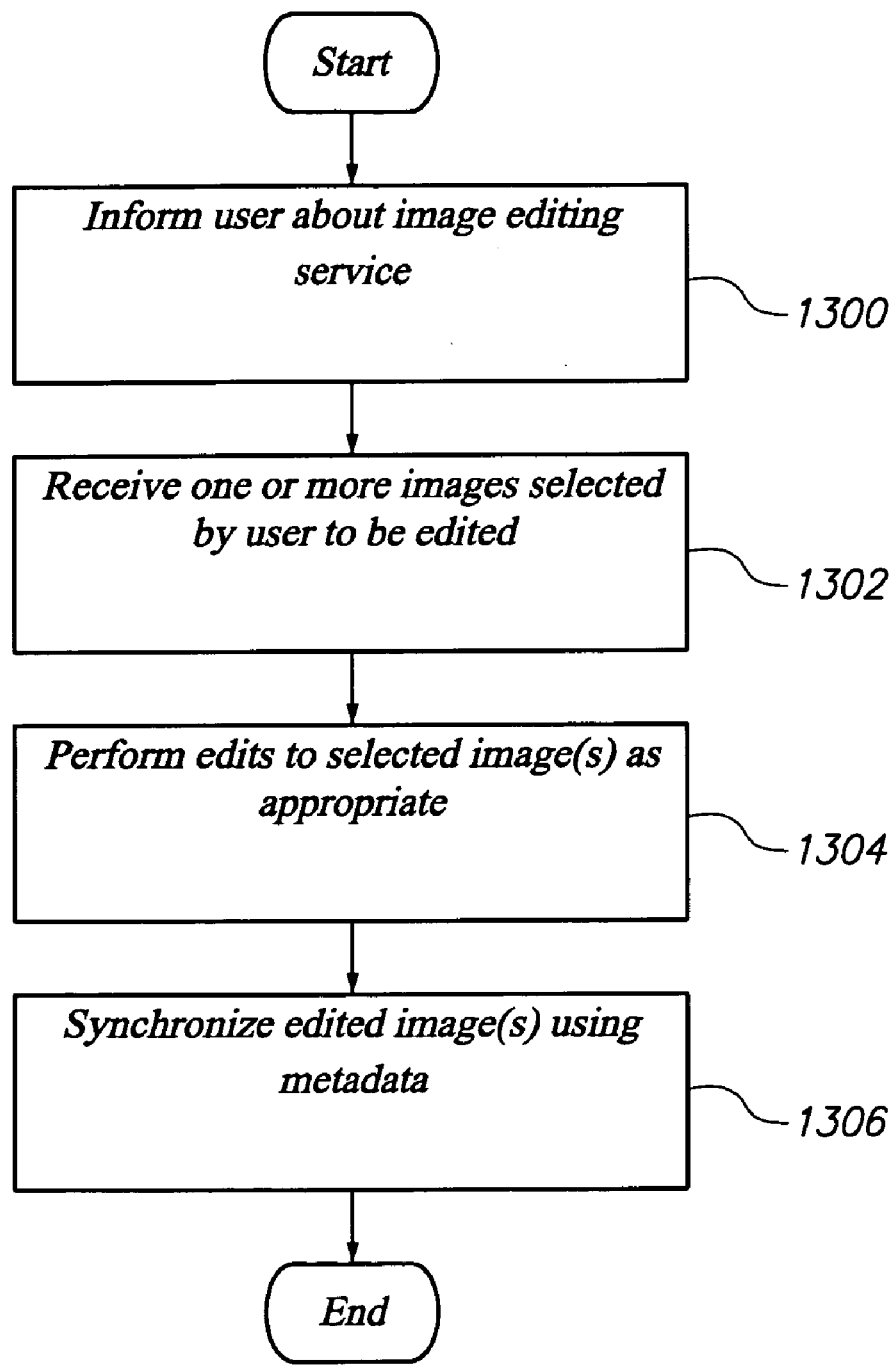
FIG. 13 is a flowchart illustrating an embodiment of a process associated with an image editing service.

FIG. 13 is a flowchart illustrating an embodiment of a process associated with an image editing service. In this example, an image editing service is offered to users. For example, unsophisticated users may not have the experience or software applications to improve or otherwise edit their images. In some cases, a user is busy and does not want to spend the time editing their images. To users such as these, an image editing service or other service to modify or manage images may be useful. In some cases, the people performing the edits and/or running or configuring a software application include photographers, graphic artists, or experienced image editors. In some embodiments, users pay a per-image fee to have their images corrected. For example, some systems may charge 10 cents per image that is edited. In cases, a fee depends upon the type of change or amount of work involved.

At 1300, a user is informed about an image editing service. A variety of passive and/or active techniques can be used to information a user about an image editing service. In one example of a passive technique, a description, prices, or other information about the service may be displayed on the main webpage of a website. In one example of an active technique, an email is sent to a user, for example who already subscribes to or uses some other service of a service provider.

One or more images selected by user to be edited are received at 1302. In some embodiments, only an indication or identification of the images to be edited is received at 1302. That is, in some embodiments, the image files are not necessarily transferred. For example, if the image editing service has access to a data store at a central repository, the image editing service already has access to the images and only needs to know which ones to process. In some embodiments, an image editing service has access to a store, for example at a local or remote device.

In some embodiments, there is some queue into which images are placed before they are edited. For example, the edits for many users may be collected and serviced in a first in, first out (FIFO) manner.

At 1304, edits to selected image(s) are performed as appropriate. In some embodiments, a user specifies what edits should be performed. In some embodiments, the person editing the image decides what edits to perform. In some embodiments, an automated tool determines what edits to make. For example, some image editing software applications have automatic analysis engines to detect red eye, blurriness, etc.

Edited image(s) are synchronized using metadata at 1306. For example, if the edit performed includes red eye reduction, metadata that includes or describes the red eye reduction is sent to appropriate device(s) or store(s). Since the user already has a copy of the image file, only the metadata needs to be sent back to the user. In some embodiments where an image editing service has access to or is operating at a central repository, the metadata is sent to the user's devices or stores in some cases. In some embodiments where the image editing service has access to or operates at some other device besides a central repository, the metadata may be first sent to a central repository and then sent to appropriate devices or stores from there.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for synchronizing a change to an image, comprising:
    obtaining at a first device a modified image wherein the modified image is associated with modified metadata;
    storing the modified metadata in a store associated with the first device; and
    sending the metadata from the first device to a second device, wherein the modified image is able to be generated on the second device using the modified metadata and a preexisting image file on the second device;
    wherein in the event a first change is made to a particular image on a first offline device and a second change is made to the same image on a second offline device and the first change and the second change are made at the same time, the method further comprises comparing the first change and the second change and determining a change to be applied.

2. A method as recited in claim 1, wherein the preexisting image file is transferred to the second device once.

3. A method as recited in claim 1, wherein the second device is associated with a central repository.

4. A method as recited in claim 1, wherein the second device is associated with a user.

5. A method as recited in claim 1, wherein the second device is associated with a web server.

6. A method as recited in claim 1 further comprising generating the modified image on the second device using the modified metadata and the preexisting image file, including generating a bit stream associated with the modified image.

7. A method as recited in claim 1 further comprising generating the modified image on the second device using the modified metadata and the preexisting image file, including generating a second image file associated with displaying the modified image via a web interface.

8. A method as recited in claim 1, wherein a first modification is associated with a first field in the modified metadata and a second modification is associated with a second field in the modified metadata.

9. A method as recited in claim 1, wherein a first modification is associated with a first piece of modified metadata and a second modification is associated with a second piece of modified metadata.

10. A method as recited in claim 1 further comprising performing a modification on an image for a fee, wherein the metadata sent is associated with the modification performed for a fee.

11. A method as recited in claim 1 further comprising performing a modification, including red eye reduction, on an image for a fee, wherein the metadata sent is associated with the modification performed for a fee.

12. A method as recited in claim 1 further comprising:
    receiving an indication associated with modifying a collection of one or more images for a fee; and
    adding the collection to a queue of images to be modified for a fee.

13. A method as recited in claim 1 further comprising:
    is receiving an indication associated with modifying a collection of one or more images for a fee; and
    adding the collection to a queue of images to be modified for a fee, wherein the queue is associated with a plurality of users.

14. A method as recited in claim 1, wherein the change determined includes a combination of the first change and the second change.

15. A computer program product for synchronizing a change to an image, the computer program product being embodied in a computer readable medium and comprising computer instructions for:
    obtaining at a first device a modified image wherein the modified image is associated with modified metadata;
    storing the modified metadata in a store associated with the first device; and sending the metadata from the first device to a second device, wherein the modified image is able to be generated on the second device using the modified metadata and a preexisting image file on the second device;
    wherein in the event a first change is made to a particular image on a first offline device and a second change is made to the same image on a second offline device and the first change and the second change are made at the same time, the first and second change are compared in order to determining a change to be applied.

* * * * *